United States Patent
Patil et al.

(10) Patent No.: US 8,693,431 B2
(45) Date of Patent: Apr. 8, 2014

(54) METHODS AND APPARATUS FOR INTERFERENCE BASED JOINT SCHEDULING OF PEER TO PEER LINKS WITH WWAN

(75) Inventors: Shailesh Patil, Bridgewater, NJ (US); Hua Wang, Bridgewater, NJ (US); Xinzhou Wu, Monmouth Junction, NJ (US); Junyi Li, Chester, NJ (US); Thomas J. Richardson, South Orange, NJ (US)

(73) Assignee: QUALCOMM Incorporated, San Diego, CA (US)

(*) Notice: Subject to any disclaimer, the term of this patent is extended or adjusted under 35 U.S.C. 154(b) by 209 days.

(21) Appl. No.: 13/232,823

(22) Filed: Sep. 14, 2011

(65) Prior Publication Data

US 2013/0064214 A1    Mar. 14, 2013

(51) Int. Cl.
H04W 4/00 (2009.01)

(52) U.S. Cl.
USPC .......................... 370/330; 370/468

(58) Field of Classification Search
USPC .......... 370/328–330, 336, 337, 345, 347, 468
See application file for complete search history.

(56) References Cited

U.S. PATENT DOCUMENTS

| | | | |
|---|---|---|---|
| 8,233,462 B2 | 7/2012 | Walton et al. | |
| 2008/0002733 A1* | 1/2008 | Sutskover | 370/436 |
| 2009/0016231 A1 | 1/2009 | Li et al. | |
| 2009/0016311 A1 | 1/2009 | Wu et al. | |
| 2009/0023460 A1 | 1/2009 | Cho et al. | |
| 2009/0221325 A1 | 9/2009 | Periyalwar et al. | |
| 2010/0169498 A1* | 7/2010 | Palanki et al. | 709/228 |
| 2010/0189048 A1 | 7/2010 | Baker et al. | |
| 2010/0195588 A1* | 8/2010 | Wan et al. | 370/329 |
| 2010/0202392 A1 | 8/2010 | Zhang et al. | |
| 2010/0284351 A1* | 11/2010 | Liang et al. | 370/329 |
| 2010/0323739 A1* | 12/2010 | Wan et al. | 455/513 |
| 2011/0170431 A1 | 7/2011 | Palanki et al. | |
| 2012/0044815 A1* | 2/2012 | Geirhofer et al. | 370/248 |
| 2012/0087347 A1* | 4/2012 | Patil et al. | 370/336 |
| 2012/0147823 A1* | 6/2012 | Patil et al. | 370/329 |
| 2012/0252510 A1* | 10/2012 | Wang et al. | 455/501 |

FOREIGN PATENT DOCUMENTS

EP    2012443 A2    1/2009

OTHER PUBLICATIONS

Geirhofer et al., "A Sensing-Based Cognitive Coexistence Method for Interfering Infrastructure and Ad-Hoc Systems", to appear in wireless communications and mobile computing, Sep. 19, 2009, pp. 1-23.
International Search Report and Written Opinion—PCT/US2012/055188—ISA/EPO—Nov. 6, 2012.

* cited by examiner

Primary Examiner — Kerri Rose
(74) Attorney, Agent, or Firm — James K. O'Hare

(57) ABSTRACT

A method of operating a first wireless device includes receiving a grant from a base station for peer-to-peer communication with a second wireless device using time-frequency resources utilized by a third wireless device for WWAN communication with the base station. In addition, the method includes receiving a transmit power for the peer-to-peer communication with the grant. The transmit power is determined based on an interference that can be caused to transmissions received by the base station from the third wireless device. Furthermore, the method includes communicating with the second wireless device at a power less than or equal to the received transmit power using peer-to-peer communication on the time-frequency resources.

53 Claims, 13 Drawing Sheets

METHODS AND APPARATUS FOR INTERFERENCE BASED JOINT SCHEDULING OF PEER TO PEER LINKS WITH WWAN

BACKGROUND

1. Field

The present disclosure relates generally to communication systems, and more particularly, to interference based joint scheduling of peer-to-peer links with wireless wide area network (WWAN).

2. Background

In WWAN, all communications between wireless devices are through the uplink/downlink channels between the wireless devices and serving base stations. When two wireless devices are in the vicinity of each other, they may communicate directly together using peer-to-peer communication instead of using the uplink/downlink channels through the serving base station(s). The peer-to-peer communication may be through resources dedicated for the peer-to-peer communication. Alternatively, the peer-to-peer communication may be through WWAN resources. A method and an apparatus are needed for facilitating peer-to-peer communication with minimal interference through WWAN resources.

SUMMARY

In an aspect of the disclosure, an apparatus and a method of operating a first wireless device are provided. According to the method, the first wireless device receives a grant from a base station for peer-to-peer communication with a second wireless device using time-frequency resources utilized by a third wireless device for WWAN communication with the base station. In addition, the first wireless device receives a transmit power for the peer-to-peer communication with the grant. The transmit power is determined based on an interference that can be caused to transmissions received by the base station from the third wireless device. Furthermore, the first wireless device communicates with the second wireless device at a power less than or equal to the received transmit power using peer-to-peer communication on the time-frequency resources.

In an aspect of the disclosure, an apparatus and a method of operating a base station are provided. According to the method, the base station transmits a grant to a first wireless device and a second wireless device in peer-to-peer communication with the first wireless device using time-frequency resources utilized by a third wireless device for WWAN communication with the base station. In addition, the base station determines a transmit power for the peer-to-peer communication between the first wireless device and the second wireless device based on an estimated interference to a signal received from the third wireless device. Furthermore, the base station transmits the transmit power with the grant to at least the first wireless device

DETAILED DESCRIPTION

Figure 1:
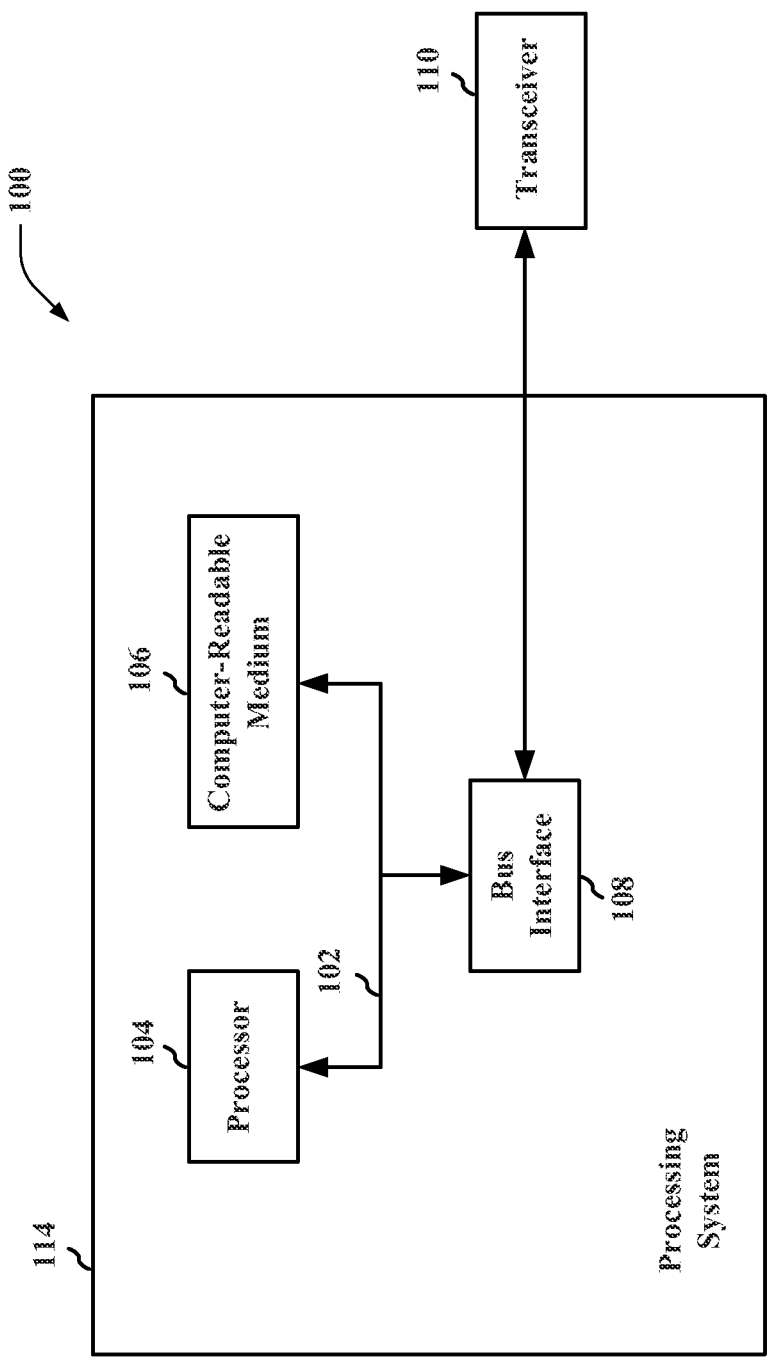
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors and/or hardware modules, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
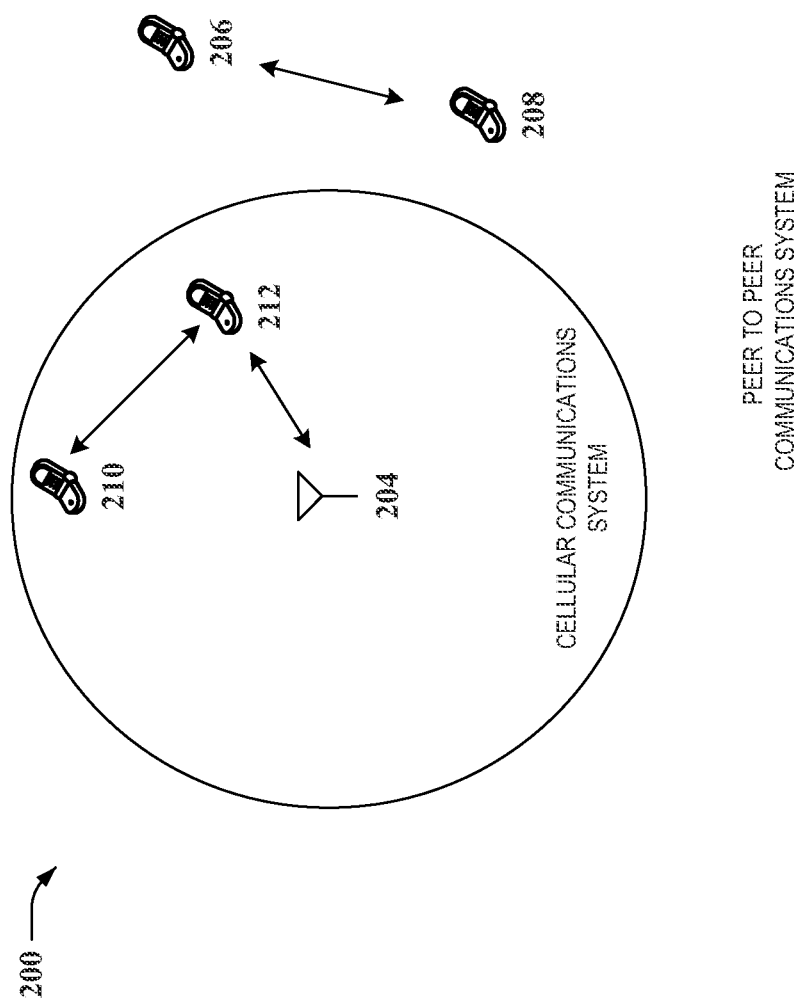
FIG. 2 is a drawing of a wireless peer-to-peer communications system.

FIG. 2 is a drawing of an exemplary peer-to-peer communications system 200. The peer-to-peer communications system 200 includes a plurality of wireless devices 206, 208, 210, 212. The peer-to-peer communications system 200 may overlap with a cellular communications system, such as for example, a wireless wide area network (WWAN). Some of the wireless devices 206, 208, 210, 212 may communicate together in peer-to-peer communication, some may communicate with the base station 204, and some may do both. For example, as shown in FIG. 2, the wireless devices 206, 208 are in peer-to-peer communication and the wireless devices 210, 212 are in peer-to-peer communication. The wireless device 212 is also communicating with the base station 204.

The wireless device may alternatively be referred to by those skilled in the art as user equipment, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 3:
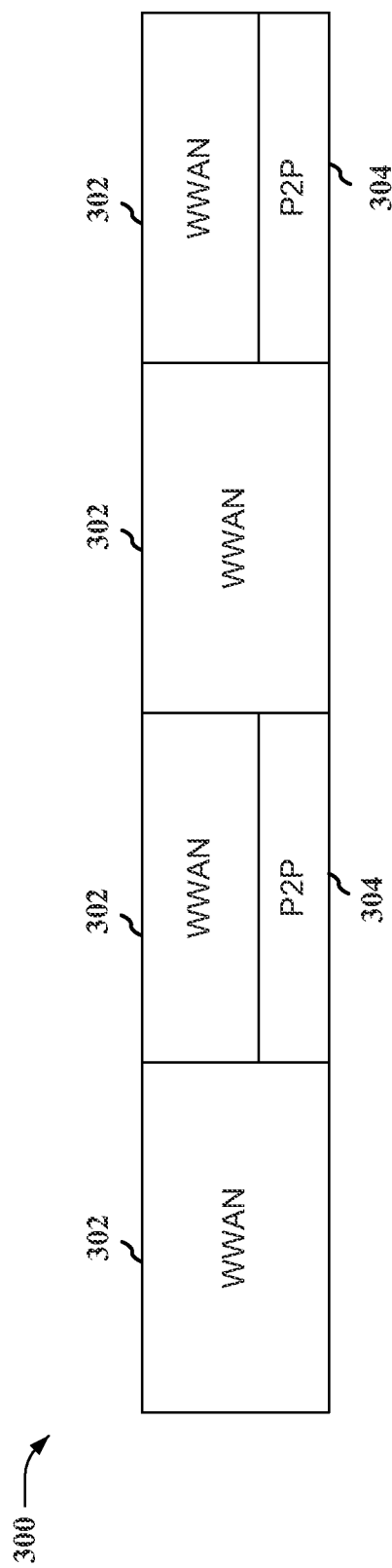
FIG. 3 is a diagram illustrating WWAN and peer-to-peer resources.

FIG. 3 is a diagram 300 illustrating WWAN and peer-to-peer resources. As shown in FIG. 3, the resource spectrum may be split into WWAN resources 302 and peer to peer (P2P) resources 304. According to an exemplary method, a wireless device (e.g., the wireless device 210 or the wireless device 212) may use the WWAN resources 302 for peer-to-peer communication based on whether the use of the WWAN resources would cause interference less than a threshold to transmissions received by a serving base station (e.g., the base station 204).

Figure 4:
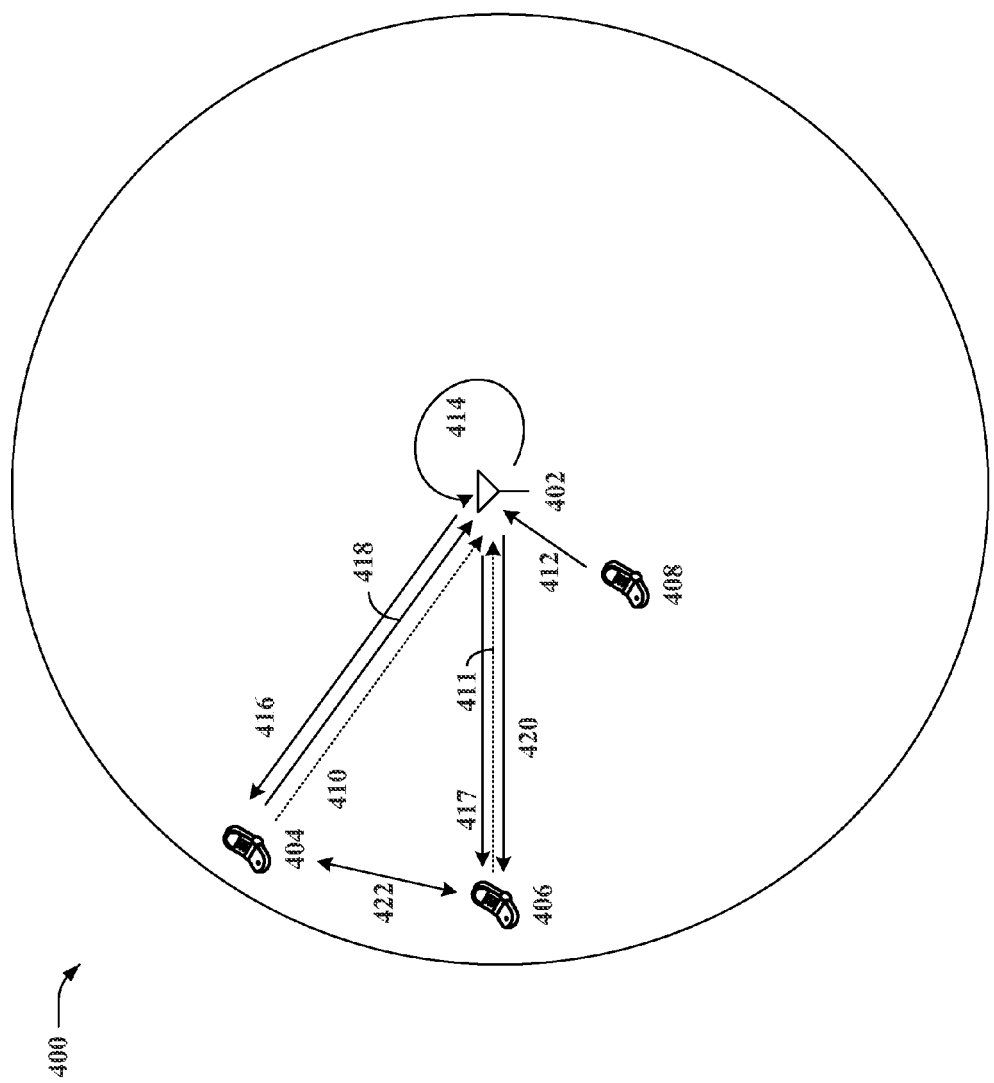
FIG. 4 is a diagram for illustrating an exemplary method.

FIG. 4 is a diagram 400 for illustrating an exemplary method. As shown in FIG. 4, the wireless devices 404, 406 are in peer-to-peer communication and the wireless device 408 is communicating with the base station 402. The wireless devices 404, 406 are within range of the base station 402. According to the first exemplary method, the base station 402 estimates the interference from the wireless device 404 and/or the wireless device 406 to a signal that may be received from the wireless device 408. The base station 402 may estimate the interference through a power control loop running between itself the wireless devices 404, 406. The base station 402 may estimate the interference based on a previous interference 410 from the wireless device 404 and/or a previous interference 411 from the wireless device 406 to a signal 412 previously received from the wireless device 408. The base station 402 may estimate the interference based on a ratio of a received signal quality and/or a signal power from the wireless device 408 to at least one of the wireless devices 404, 406. When the ratio is less than a threshold, the interference is high and the base station 402 does not send a grant to the wireless devices 404, 406 to use identical resources concurrently with the wireless device 408. When the ratio is greater than the threshold, the interference is lower than an interference threshold and the base station 402 determines (414) a transmit power based on how much greater the ratio is compared to the threshold, and sends a grant 416 with the transmit power to the wireless device 404 to use identical resources concurrently with the wireless device 408. The base station 402 also sends a grant 417 to the wireless device 406. The grant 417 may also include the determined transmit power. The grant 417 need not include the determined transmit power when the wireless device 406 will act as a receiver in the peer-to-peer communication. When the ratio is high, the base station 416 may determine (414) the transmit power to be $P_1$, and when the ratio is low, but greater than the threshold, the base station may determine (414) the transmit power to be $P_2$, where $P_2<P_1$. In one configuration, the determined transmit power is a maximum transmit power that may be used for peer-to-peer communication between the wireless devices 404, 406.

When the interference is less than the interference threshold, the base station 402 determines (414) to transmit the grant 416, 417, and when the interference is greater than the interference threshold, the base station 402 determines not to transmit the grant 416, 417. As such, the base station 402 determines (414) whether the estimated interference is less than an interference threshold. If the interference is less than an interference threshold, the base station 402 determines (414) a transmit power for peer-to-peer communication between the wireless devices 404, 406, and transmits a grant 416 including the transmit power to the wireless device 404. As discussed supra, the base station 402 also transmits a grant 417 to the wireless device 406. The grant 417 may also include the determined transmit power. The grants 416, 417 are for allowing the wireless devices 404, 406, respectively, to use the same time-frequency resources utilized by the wireless device 408 to communicate in UL with the base station 402.

In response to the grant 416, the wireless device 406 may send an acknowledgment (ACK) or a negative acknowledgment (NACK) 418 to the base station 402 in order to acknowledge the grant. The ACK/NACK 418 may be sent through a physical uplink control channel (PUCCH). The base station 402 may forward the ACK/NACK 420 to the wireless device 406. The ACK/NACK 420 may be sent through a physical hybrid indicator channel (PHICH). If the wireless device 404 accepts the grant, the wireless devices 404, 406 may communicate together (422) directly using peer-to-peer communication through the same resources (e.g., the same resource elements at the same subcarriers and orthogonal frequency division multiplexing (OFDM) symbols) concurrently used by the wireless device 408 to communicate in UL with the base station 402 using WWAN communication.

Figure 5:
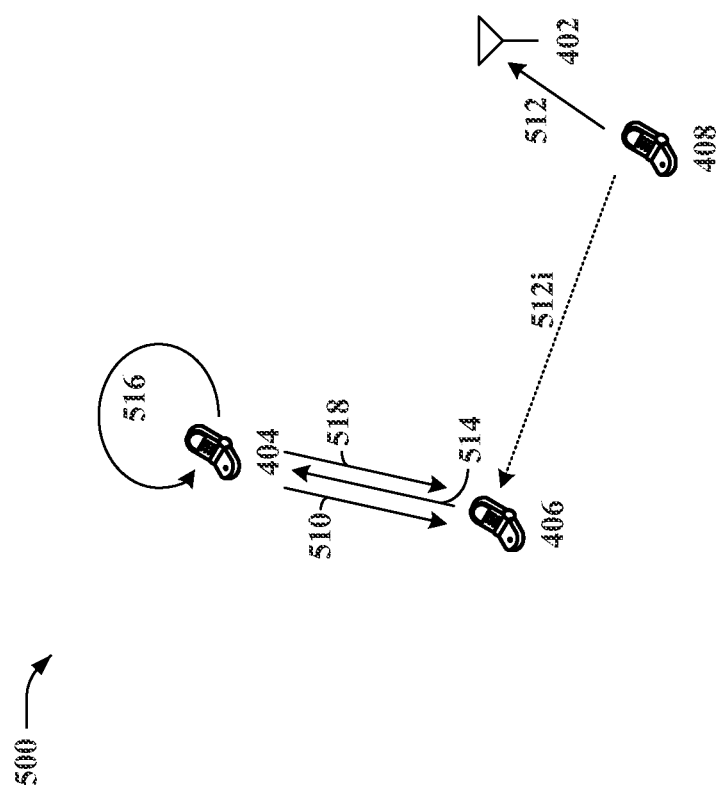
FIG. 5 is a diagram for illustrating a first exemplary method for estimating a rate for the scheduled peer-to-peer communication.

FIG. 5 is a diagram 500 for illustrating a first exemplary method for estimating a rate for the scheduled peer-to-peer communication. As shown in FIG. 5, the wireless device 404 transmits a pilot signal 510. The wireless device 406 listens to the pilot signal 510 and responds with channel quality indicator (CQI) feedback 514. The CQI feedback 514 takes into account the interference 512$i$ generated by the wireless device 408, assuming the wireless device 408 is transmitting 512 in UL at the time that the wireless device 406 receives the pilot signal 510. The wireless device 404 receives the CQI feedback 514 and determines (516) a rate based on the CQI feedback 514. The wireless device 404 may then transmit 518 the determined rate and data at the determined rate to the wireless device 406.

Figure 6:
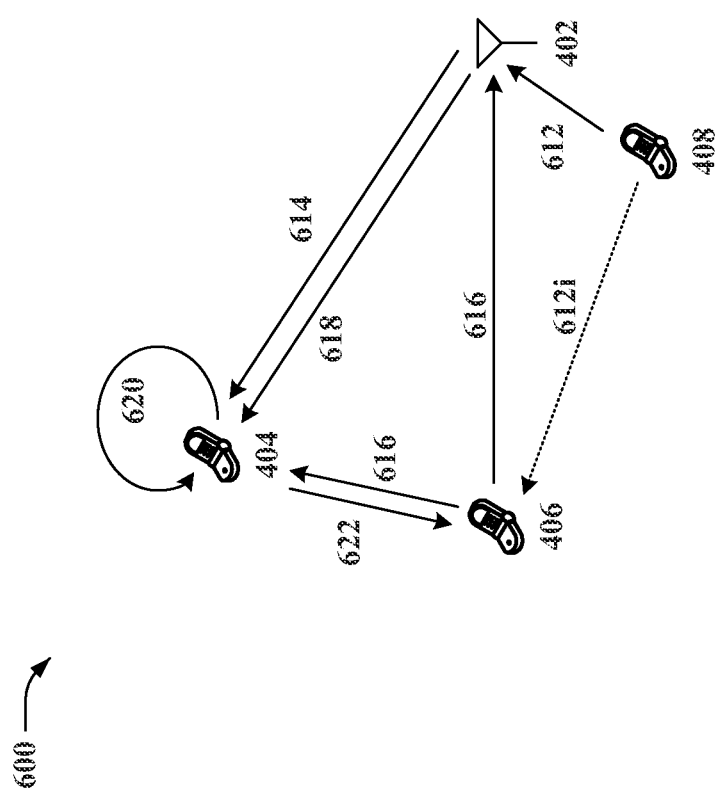
FIG. 6 is a diagram for illustrating a second exemplary method for estimating a rate for the scheduled peer-to-peer communication.

FIG. 6 is a diagram 600 for illustrating a second exemplary method for estimating a rate for the scheduled peer-to-peer communication. As shown in FIG. 6, the base station 402 transmits a location 614 within WWAN resources of reference signals transmitted from the wireless device 406. The wireless device 406 transmits references signals 616, which are received by the base station 402. The reference signals 616 are also received by the wireless device 404, as the wireless device 404 listens for reference signals on the resources indicated by the received location information 614. The wireless device 404 also receives a grant 618 from the base station 402. The grant 618 includes the power $P_1$ at which the wireless device 406 transmitted the reference signals 616. The wireless device 404 estimates (620) the channel H between the wireless devices 404, 406 based on the power $P_1$ and a power $P_2$ at which the reference signals 616 were received by the wireless device 404 (i.e., $H=P_2/P_1$), and determines (620) a rate based on the estimated channel H. The wireless device 404 may then transmit 622 the determined rate and data at the determined rate to the wireless device 406. The second exemplary method does not take into account the interference generated by the wireless device 408 through a transmission 612 in UL to the base station 402.

Figure 7:
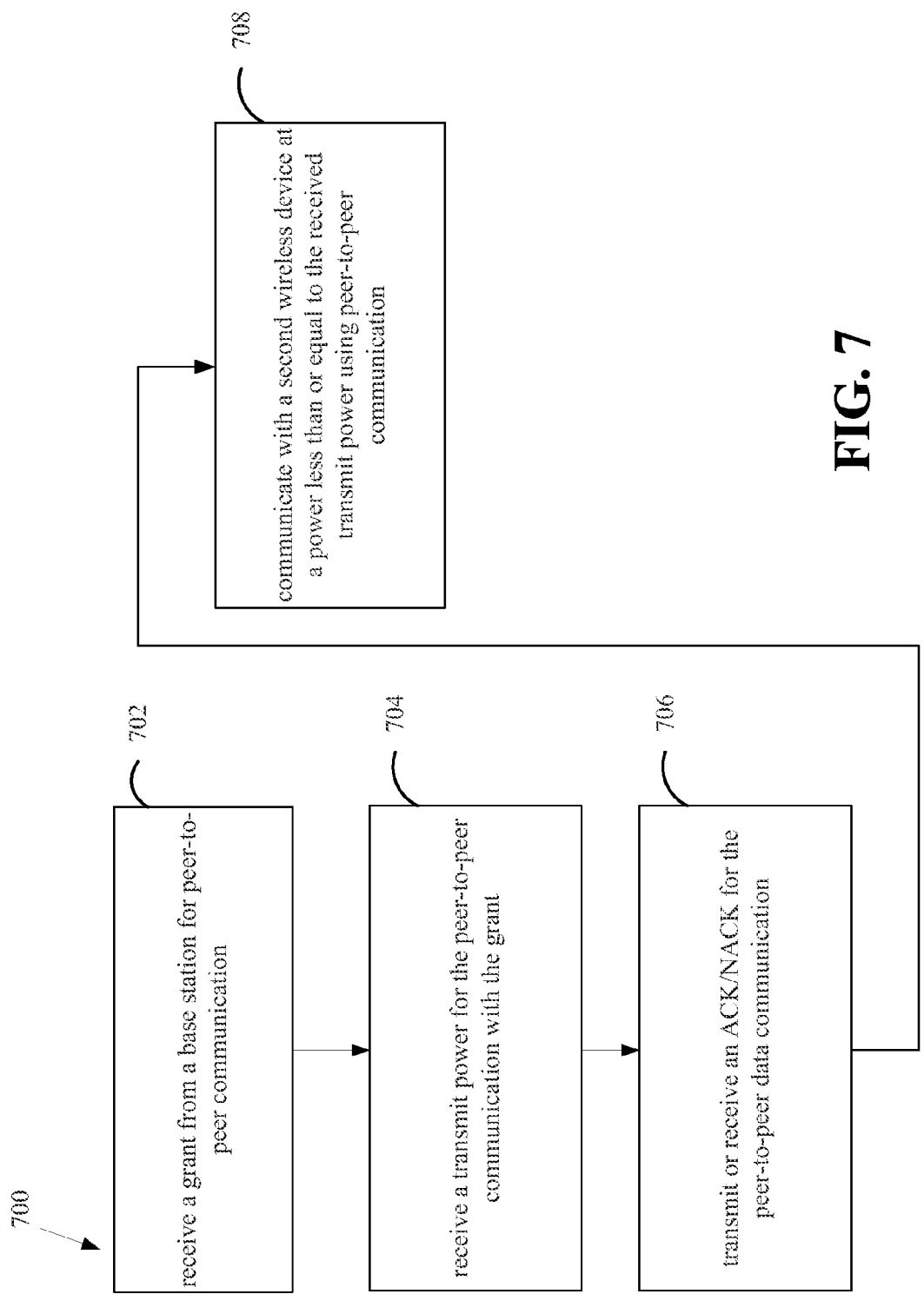
FIG. 7 is a flow chart of an exemplary method of wireless communication.

FIG. 7 is a flow chart 700 of an exemplary method of wireless communication. The method is performed by a wireless device. As shown in FIG. 7, the wireless device (e.g., the wireless device 404) receives a grant from a base station (e.g., the base station 402) for peer-to-peer communication with a second wireless device (e.g., the wireless device 406) using time-frequency resources utilized by a third wireless device (e.g., the wireless device 408) for WWAN communication with the base station (702). The grant may be received from the base station only when an interference caused to transmissions received by the base station from the third wireless device is determined by the base station to be less than an interference threshold. The wireless device receives a transmit power for the peer-to-peer communication with the grant (704). The transmit power is determined based on an interference that can be caused to transmissions received by the base station from the third wireless device. In one configuration, in response to the grant, the wireless device may transmit an ACK/NACK for a peer-to-peer data communication to the base station using WWAN resources (706). In another configuration, the wireless device may receive an ACK/NACK for a peer-to-peer data communication from the base station using WWAN resources (706). In such a configuration, the ACK/NACK originates from the second wireless device. The wireless device then communicates with the second wireless device at a power less than or equal to the received transmit power using peer-to-peer communication on the time-frequency resources (708). As discussed supra, the transmit power may be a maximum transmit power for the peer-to-peer communication between the first wireless device and the second wireless device.

Figure 8:
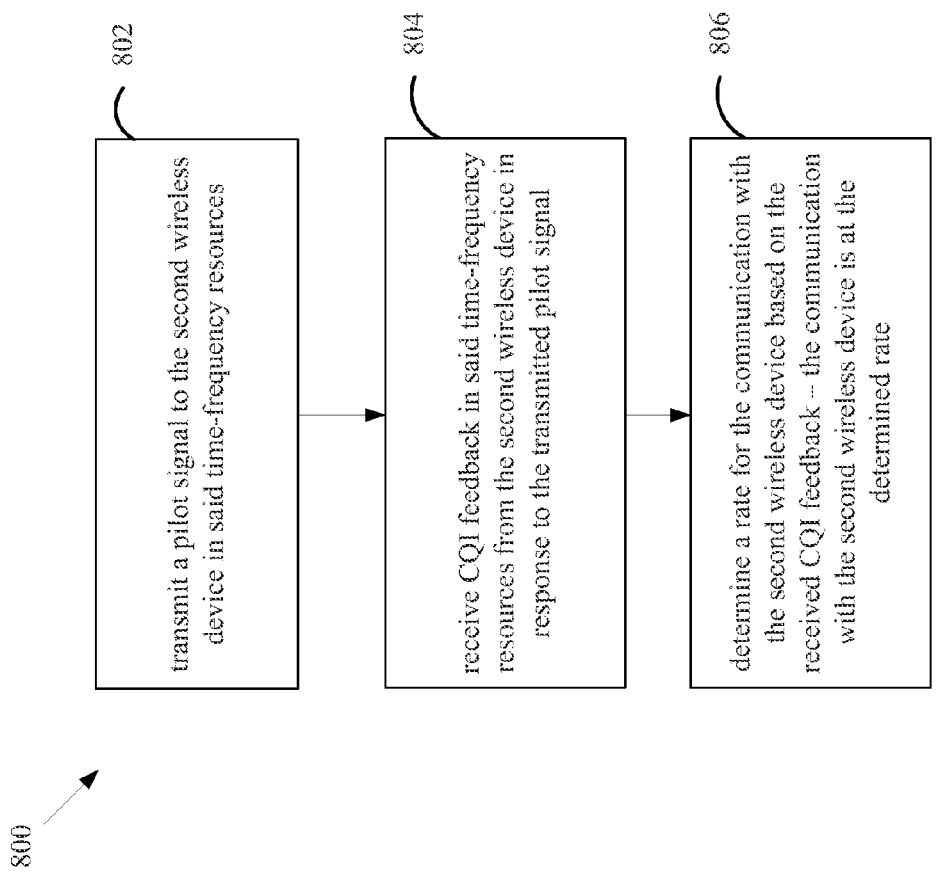
FIG. 8 is a flow chart of a first method of wireless communication for estimating a rate for the scheduled peer-to-peer communication.

FIG. 8 is a flow chart 800 of a first method of wireless communication for estimating a rate for the scheduled peer-to-peer communication. The method is performed by the wireless device that will act as the transmitter in the peer-to-peer communication. As shown in FIG. 8, the wireless device (e.g., the wireless device 404) transmits a pilot signal to the second wireless device (e.g., the wireless device 406) in the time-frequency resources utilized by the third wireless device (e.g., the wireless device 408) (802). The wireless device receives CQI feedback in the time-frequency resources from the second wireless device in response to the transmitted pilot signal (804). The wireless device determines a rate for the communication with the second wireless device based on the received CQI feedback (806). The communication (see 708 of FIG. 7) with the second wireless device is at the determined rate.

Figure 9:
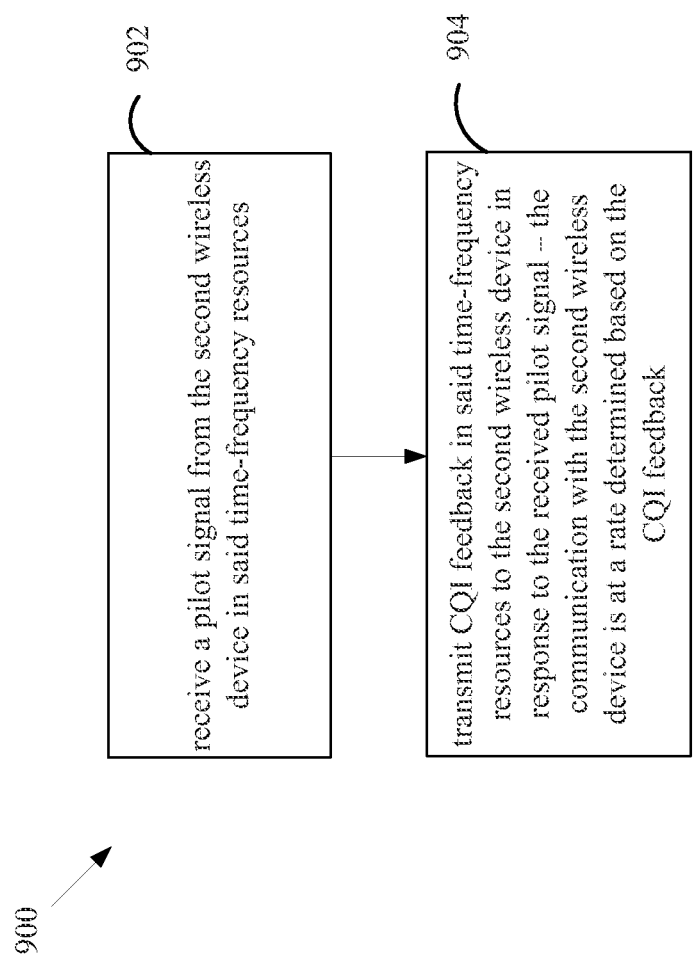
FIG. 9 is another flow chart of the first method of wireless communication for estimating a rate for the scheduled peer-to-peer communication.

FIG. 9 is another flow chart 900 of the first method of wireless communication for estimating a rate for the scheduled peer-to-peer communication. The method is performed by the wireless device that will act as the receiver in the peer-to-peer communication. The wireless device (e.g., the wireless device 406) receives a pilot signal from the second wireless device (e.g., the wireless device 404) in the time-frequency resources utilized by the third wireless device (e.g., the wireless device 408) (902). The wireless device transmits CQI feedback in said time-frequency resources to the second wireless device in response to the received pilot signal (904). The communication (see 708 of FIG. 7) with the second wireless device is at a rate determined based on the channel quality indicator feedback.

Figure 10:
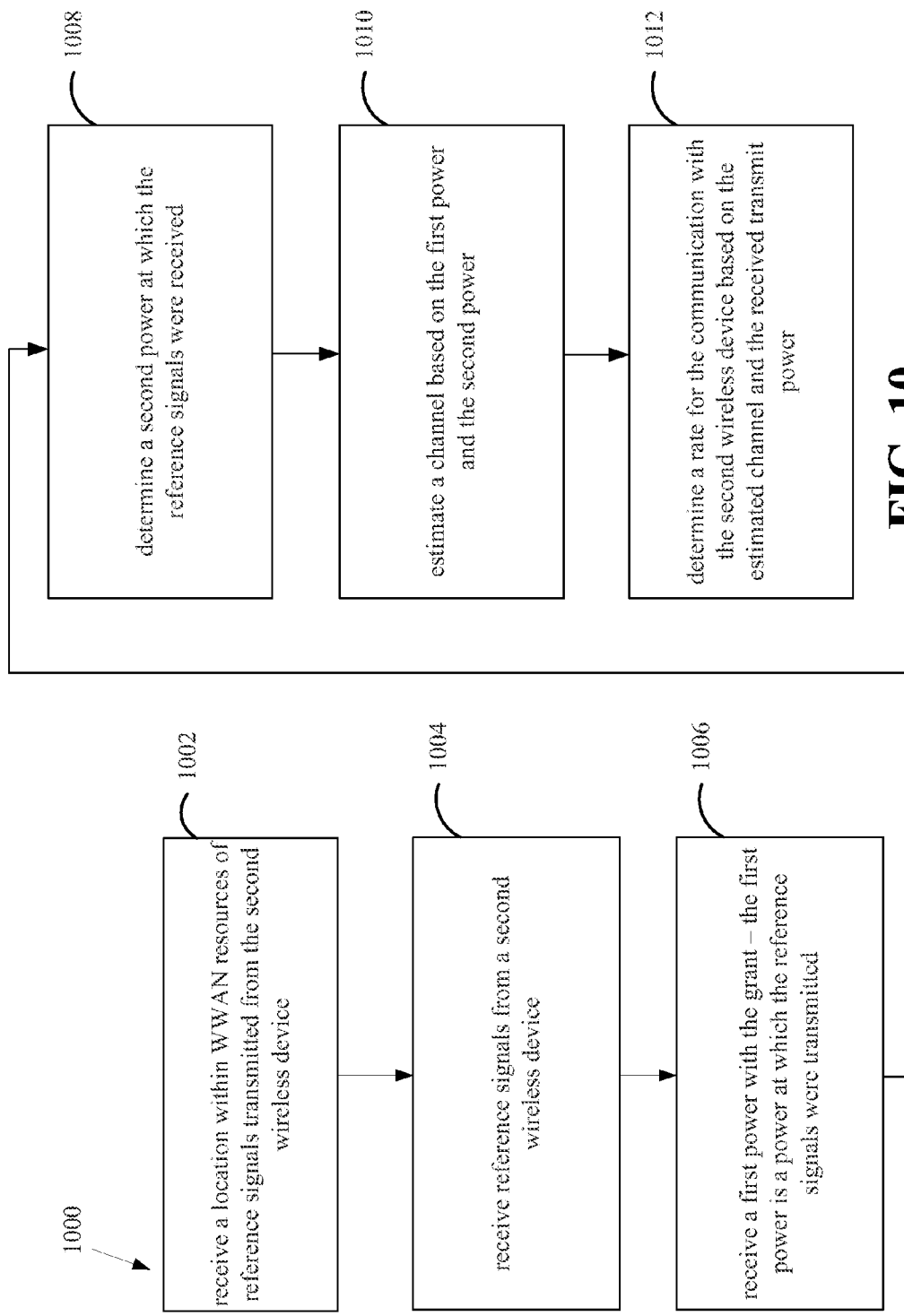
FIG. 10 is a flow chart of a second method of wireless communication for estimating a rate for the scheduled peer-to-peer communication.

FIG. 10 is a flow chart 1000 of a second method of wireless communication for estimating a rate for the scheduled peer-to-peer communication. The method is performed by the wireless device that acts as the transmitter in the peer-to-peer communication. As shown in FIG. 10, the wireless device (e.g., the wireless device 404) may receive a location within WWAN resources of reference signals transmitted from the second wireless device (e.g., the wireless device 406) (1002). The location of the reference signals within the WWAN resources are received from the base station (e.g., the base station 402). Using the received location information, the wireless device receives reference signals from the second wireless device (1004). The wireless device receives a first power $P_1$ with the grant (see 702 of FIG. 7) (1006). The first power $P_1$ is a power at which the reference signals were transmitted (1006). The wireless device determines a second power $P_2$ at which the reference signals were received (1008). The wireless device estimates a channel H based on the first power $P_1$ and the second power $P_2$ (1010). The wireless device determines a rate for the communication with the second wireless device based on the estimated channel H and the received transmit power (see 704 of FIG. 7) (1012). The communication (see 708 of FIG. 7) with the second wireless device is at the determined rate.

Figure 11:
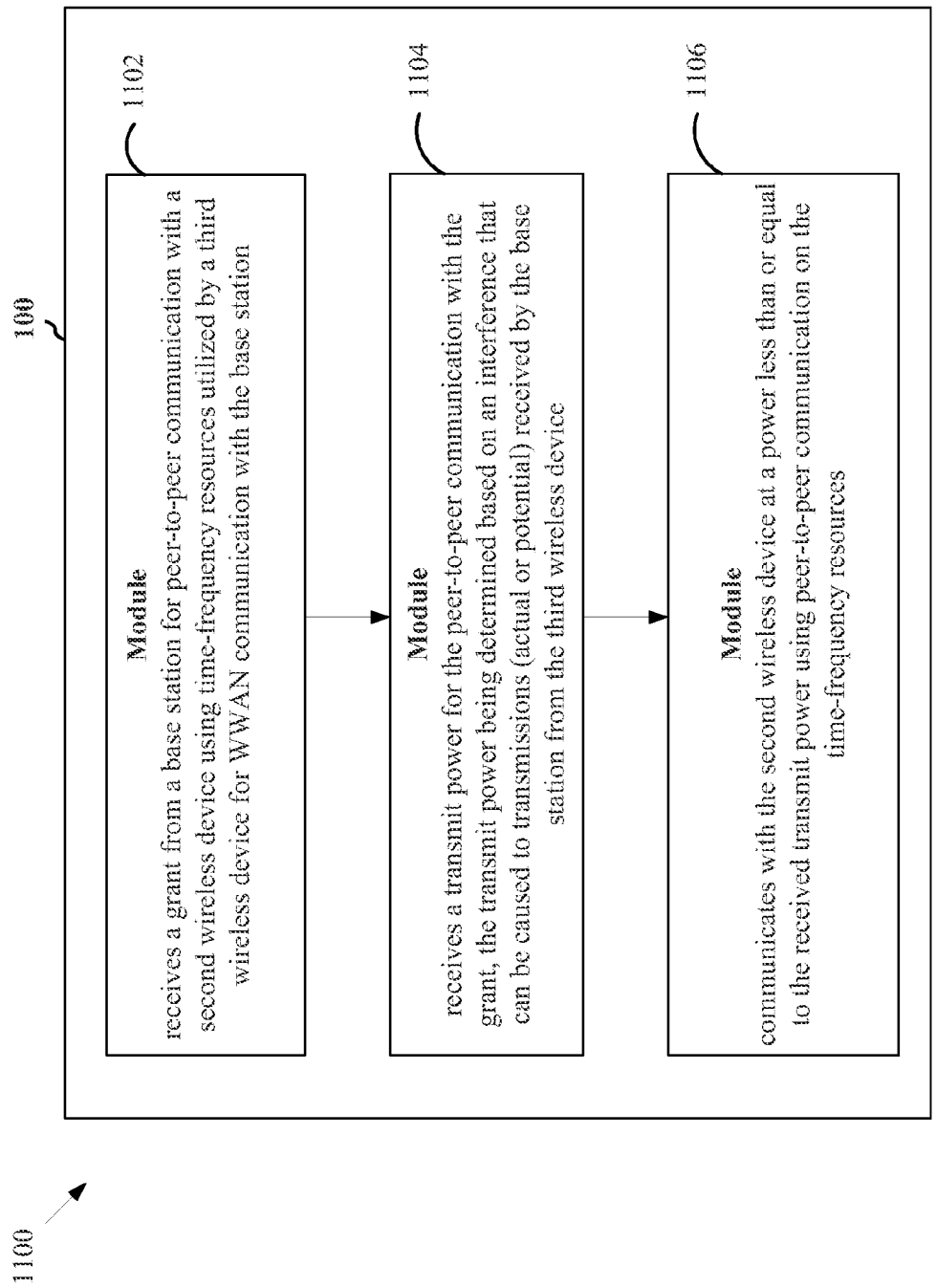
FIG. 11 is a conceptual block diagram illustrating the functionality of a first exemplary apparatus.

FIG. 11 is a conceptual block diagram 1100 illustrating the functionality of a first exemplary apparatus 100. The apparatus may be a wireless device, such as the wireless device 404 or the wireless device 406. The apparatus 100 includes a module 1102 that receives a grant from a base station for peer-to-peer communication with a second wireless device using time-frequency resources utilized by a third wireless device for WWAN communication with the base station. The apparatus 100 further includes a module 1104 that receives a transmit power for the peer-to-peer communication with the grant. The transmit power is determined based on an interference that can be caused to transmissions received by the base station from the third wireless device. The apparatus 100 further includes a module 1106 that communicates with the second wireless device at a power less than or equal to the received transmit power using peer-to-peer communication on the time-frequency resources. The apparatus 100 may include additional modules that perform each of the steps in the aforementioned flow charts of FIGS. 7-10. As such, each step in the aforementioned flow charts of FIGS. 7-10 may be performed by a module and the apparatus 100 may include one or more of those modules.

Figure 12:
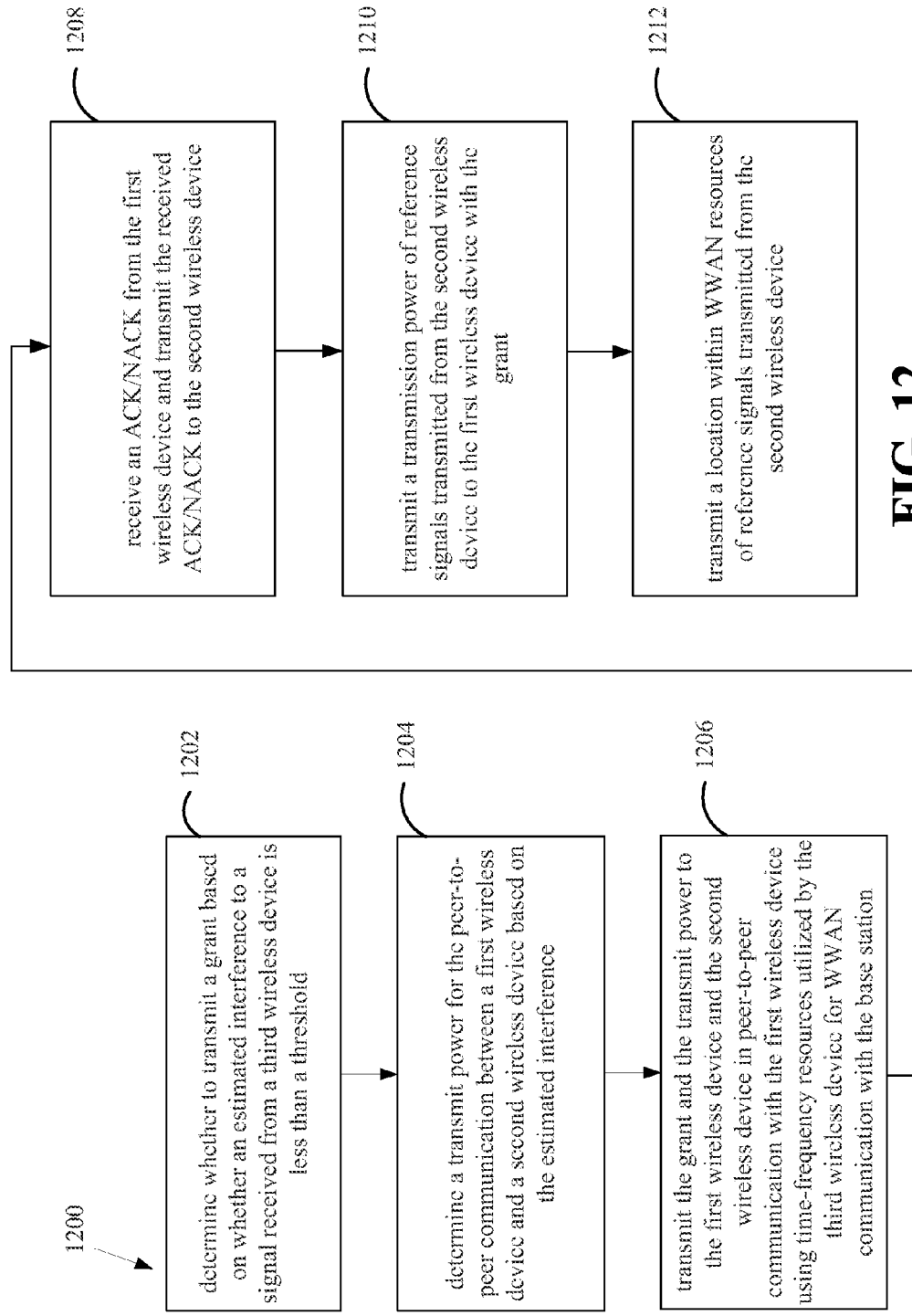
FIG. 12 is a flow chart of another exemplary method of wireless communication.

FIG. 12 is a flow chart 1200 of another exemplary method of wireless communication. The method is performed by a base station, such as the base station 402. The base station determines whether to transmit a grant based on whether an estimated interference to a signal received from the third wireless device is less than an interference threshold (1202). The interference may be estimated based on at least one of the received signal quality or signal power from the third wireless device and at least one of the first wireless device or the second wireless device. The interference may be estimated based on a previous interference from at least one of the first wireless device or the second wireless device to the signal received from the third wireless device. The base station determines a transmit power for the peer-to-peer communication between the first wireless device and the second wireless device based on the estimated interference (1204). The transmit power may be a maximum transmit power for the peer-to-peer communication between a first wireless device (e.g., the wireless device 404) and a second wireless device (e.g., the wireless device 406). The base station transmits the grant and the transmit power to the first wireless device and the second wireless device in peer-to-peer communication with the first wireless device using time-frequency resources utilized by a third wireless device (e.g., the wireless device 408) for WWAN communication with the base station (1206). The base station receives an ACK/NACK from the first wireless device using WWAN resources for a peer-to-peer data communication between the first wireless device and the second wireless device and transmits the received ACK or NACK to the second wireless device using the WWAN resources (1208). The base station may also transmit a transmission power of reference signals transmitted from the second wireless device to the first wireless device with the grant (1210). The base station may also transmit a location within WWAN resources of reference signals transmitted from the second wireless device (1212).

Figure 13:
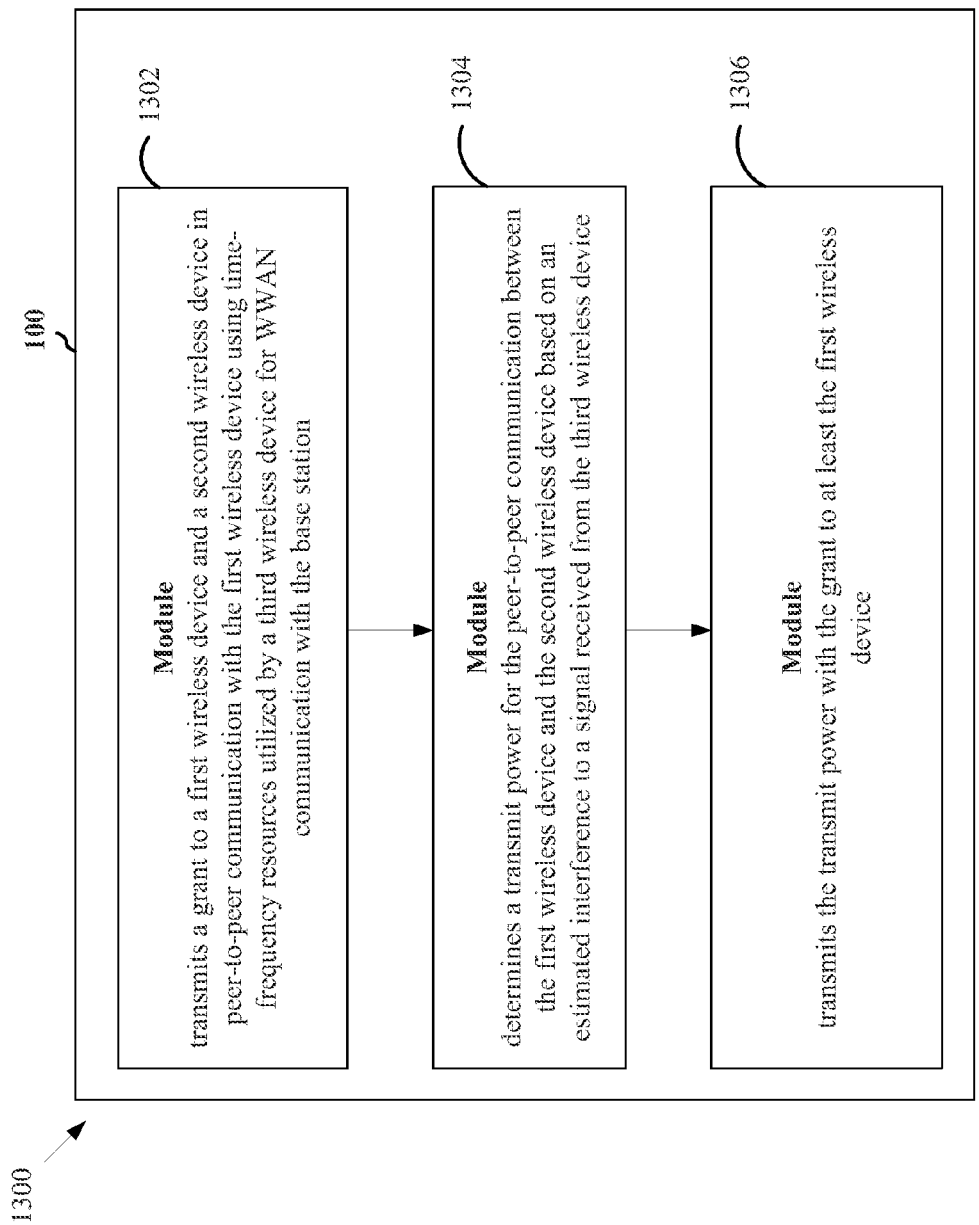
FIG. 13 is a conceptual block diagram illustrating the functionality of a second exemplary apparatus.

FIG. 13 is a conceptual block diagram 1300 illustrating the functionality of a second exemplary apparatus 100. The apparatus 100 may be a base station, such as the base station 402. The apparatus 100 includes a module 1302 that transmits a grant to a first wireless device and a second wireless device in peer-to-peer communication with the first wireless device using time-frequency resources utilized by a third wireless device for WWAN communication with the base station. The apparatus 100 further includes a module 1304 that determines a transmit power for the peer-to-peer communication between the first wireless device and the second wireless device based on an estimated interference to a signal received from the third wireless device. The apparatus 100 further includes a module 1306 that transmits the transmit power with the grant to at least the first wireless device. The apparatus 100 may include additional modules that perform each of the steps in the aforementioned flow chart of FIG. 12. As such, each step in the aforementioned flow chart of FIG. 12 may be performed by a module and the apparatus 100 may include one or more of those modules.

Referring to FIG. 1 and FIG. 11, in one configuration, the apparatus 100 for wireless communication, which may be a wireless device, includes means for receiving a grant from a base station for peer-to-peer communication with a second apparatus using time-frequency resources utilized by a third apparatus for WWAN communication with the base station. The apparatus 100 further includes means for receiving a transmit power for the peer-to-peer communication with the grant. The transmit power is determined based on an interference that can be caused to transmissions received by the base station from the third apparatus. The apparatus 100 further includes means for communicating with the second apparatus at a power less than or equal to the received transmit power using peer-to-peer communication on the time-frequency resources. The apparatus 100 may further include means for transmitting a pilot signal to the second apparatus in said time-frequency resources, means for receiving channel quality indicator feedback in said time-frequency resources from the second apparatus in response to the transmitted pilot signal, and means for determining a rate for the communication with the second apparatus based on the received channel quality indicator feedback. In such a configuration, the communication with the second apparatus is at the determined rate. The apparatus 100 may further include means for receiving a pilot signal from the second apparatus in said time-frequency resources, and means for transmitting channel quality indicator feedback in said time-frequency resources to the second apparatus in response to the received pilot signal. In such a configuration, the communication with the second apparatus is at a rate determined based on the channel quality indicator feedback. The apparatus 100 may further include means for receiving reference signals from the second apparatus, means for receiving a first power with the grant in which the first power is a power at which the reference signals were transmitted, means for determining a second power at which the reference signals were received, means for estimating a channel based on the first power and the second power, and means for determining a rate for the communication with the second apparatus based on the estimated channel and the received transmit power. In such a configuration, the communication with the second apparatus is at the determined rate. The apparatus 100 may further include means for receiving a location within WWAN resources of reference signals transmitted from the second apparatus. In such a configuration, the location of the reference signals within the WWAN resources is received from the base station. The apparatus 100 may further include means for transmitting an ACK or NACK for a peer-to-peer data communication to the base station using WWAN resources. The apparatus 100 may further include means for receiving an ACK or NACK for a peer-to-peer data communication from the base station using WWAN resources. In such a configuration, the ACK or NACK originates from the second apparatus. The aforementioned means is the apparatus 100 or the processing system 114 configured to perform the functions recited by the aforementioned means.

Referring to FIG. 1 and FIG. 13, in one configuration, the apparatus 100 for wireless communication, which may be a base station, includes means for transmitting a grant to a first wireless device and a second wireless device in peer-to-peer communication with the first wireless device using time-frequency resources utilized by a third wireless device for WWAN communication with the apparatus. The apparatus 100 further includes means for determining a transmit power for the peer-to-peer communication between the first wireless device and the second wireless device based on an estimated interference to a signal received from the third wireless device. The apparatus 100 further includes means for transmitting the transmit power with the grant to at least the first wireless device. The apparatus 100 may further include means for determining whether to transmit the grant based on whether the estimated interference is less than a threshold. The apparatus 100 may further include means for receiving an ACK or a NACK from the first wireless device using WWAN resources for a peer-to-peer data communication between the first wireless device and the second wireless device, and means for transmitting the received ACK or NACK to the second wireless device using the WWAN resources. The apparatus 100 may further include means for transmitting a transmission power of reference signals transmitted from the second wireless device to the first wireless device with the grant. The apparatus 100 may further include means for transmitting a location within WWAN resources of reference signals transmitted from the second wireless device. The aforementioned means is the apparatus 100 or the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of operating a first wireless device, comprising:

receiving a grant from a base station for peer-to-peer communication with a second wireless device using time-frequency resources utilized by a third wireless device for wireless wide area network (WWAN) communication with the base station;

receiving a transmit power for the peer-to-peer communication with the grant, the transmit power being determined based on an interference that can be caused to transmissions received by the base station from the third wireless device; and communicating with the second wireless device at a power less than or equal to the received transmit power using peer-to-peer communication on the time-frequency resources.

2. The method of claim 1, wherein the transmit power is a maximum transmit power for the peer-to-peer communication between the first wireless device and the second wireless device.

3. The method of claim 1, further comprising:

transmitting a pilot signal to the second wireless device in said time-frequency resources;

receiving channel quality indicator feedback in said time-frequency resources from the second wireless device in response to the transmitted pilot signal; and determining a rate for the communication with the second wireless device based on the received channel quality indicator feedback, wherein the communication with the second wireless device is at the determined rate.

4. The method of claim 1, further comprising:

receiving a pilot signal from the second wireless device in said time-frequency resources; and transmitting channel quality indicator feedback in said time-frequency resources to the second wireless device in response to the received pilot signal, wherein the communication with the second wireless device is at a rate determined based on the channel quality indicator feedback.

5. The method of claim 1, further comprising:

receiving reference signals from the second wireless device;

receiving a first power with the grant, the first power being a power at which the reference signals were transmitted;

determining a second power at which the reference signals were received;

estimating a channel based on the first power and the second power; and determining a rate for the communication with the second wireless device based on the estimated channel and the received transmit power, wherein the communication with the second wireless device is at the determined rate.

6. The method of claim 5, further comprising receiving a location within WWAN resources of reference signals transmitted from the second wireless device, the location of the reference signals within the WWAN resources being received from the base station.

7. The method of claim 1, further comprising transmitting an acknowledgment (ACK) or a negative acknowledgment (NACK) for a peer-to-peer data communication to the base station using WWAN resources.

8. The method of claim 1, further comprising receiving an acknowledgment (ACK) or a negative acknowledgment (NACK) for a peer-to-peer data communication from the base station using WWAN resources, the ACK or the NACK originating from the second wireless device.

9. The method of claim 1, wherein the grant is received from the base station only when the interference is less than a threshold.

10. A method of operating a base station, comprising:

transmitting a grant to a first wireless device and a second wireless device in peer-to-peer communication with the first wireless device using time-frequency resources utilized by a third wireless device for wireless wide area network (WWAN) communication with the base station;

determining a transmit power for the peer-to-peer communication between the first wireless device and the second wireless device based on an estimated interference to a signal received from the third wireless device; and transmitting the transmit power with the grant to at least the first wireless device.

11. The method of claim 10, wherein the interference is estimated based on at least one of the received signal quality or signal power from the third wireless device and at least one of the first wireless device or the second wireless device.

12. The method of claim 10, further comprising determining whether to transmit the grant based on whether the estimated interference is less than a threshold.

13. The method of claim 10, wherein the interference is estimated based on a previous interference from at least one of the first wireless device or the second wireless device to the signal received from the third wireless device.

14. The method of claim 10, wherein the transmit power is a maximum transmit power for the peer-to-peer communication between the first wireless device and the second wireless device.

15. The method of claim 10, further comprising:

receiving an acknowledgment (ACK) or a negative acknowledgment (NACK) from the first wireless device using WWAN resources for a peer-to-peer data communication between the first wireless device and the second wireless device; and transmitting the received ACK or NACK to the second wireless device using the WWAN resources.

16. The method of claim 10, further comprising transmitting a transmission power of reference signals transmitted from the second wireless device to the first wireless device with the grant.

17. The method of claim 10, further comprising transmitting a location within WWAN resources of reference signals transmitted from the second wireless device.

18. An apparatus for wireless communication, comprising:

means for receiving a grant from a base station for peer-to-peer communication with a second apparatus using time-frequency resources utilized by a third apparatus for wireless wide area network (WWAN) communication with the base station;

means for receiving a transmit power for the peer-to-peer communication with the grant, the transmit power being determined based on an interference that can be caused to transmissions received by the base station from the third apparatus; and means for communicating with the second apparatus at a power less than or equal to the received transmit power using peer-to-peer communication on the time-frequency resources.

19. The apparatus of claim 18, wherein the transmit power is a maximum transmit power for the peer-to-peer communication between the apparatus and the second apparatus.

20. The apparatus of claim 18, further comprising:

means for transmitting a pilot signal to the second apparatus in said time-frequency resources;

means for receiving channel quality indicator feedback in said time-frequency resources from the second apparatus in response to the transmitted pilot signal; and means for determining a rate for the communication with the second apparatus based on the received channel quality indicator feedback, wherein the communication with the second apparatus is at the determined rate.

21. The apparatus of claim 18, further comprising:

means for receiving a pilot signal from the second apparatus in said time-frequency resources; and means for transmitting channel quality indicator feedback in said time-frequency resources to the second apparatus in response to the received pilot signal, wherein the communication with the second apparatus is at a rate determined based on the channel quality indicator feedback.

22. The apparatus of claim 18, further comprising:

means for receiving reference signals from the second apparatus;

means for receiving a first power with the grant, the first power being a power at which the reference signals were transmitted;

means for determining a second power at which the reference signals were received;

means for estimating a channel based on the first power and the second power; and means for determining a rate for the communication with the second apparatus based on the estimated channel and the received transmit power, wherein the communication with the second apparatus is at the determined rate.

23. The apparatus of claim 22, further comprising means for receiving a location within WWAN resources of reference signals transmitted from the second apparatus, the location of the reference signals within the WWAN resources being received from the base station.

24. The apparatus of claim 18, further comprising means for transmitting an acknowledgment (ACK) or a negative acknowledgment (NACK) for a peer-to-peer data communication to the base station using WWAN resources.

25. The apparatus of claim 18, further comprising means for receiving an acknowledgment (ACK) or a negative acknowledgment (NACK) for a peer-to-peer data communication from the base station using WWAN resources, the ACK or the NACK originating from the second apparatus.

26. The apparatus of claim 18, wherein the grant is received from the base station only when the interference is less than a threshold.

27. An apparatus for wireless communication, comprising:
means for transmitting a grant to a first wireless device and a second wireless device in peer-to-peer communication with the first wireless device using time-frequency resources utilized by a third wireless device for wireless wide area network (WWAN) communication with the apparatus;

means for determining a transmit power for the peer-to-peer communication between the first wireless device and the second wireless device based on an estimated interference to a signal received from the third wireless device; and means for transmitting the transmit power with the grant to at least the first wireless device.

28. The apparatus of claim 27, wherein the interference is estimated based on at least one of the received signal quality or signal power from the third wireless device and at least one of the first wireless device or the second wireless device.

29. The apparatus of claim 27, further comprising means for determining whether to transmit the grant based on whether the estimated interference is less than a threshold.

30. The apparatus of claim 27, wherein the interference is estimated based on a previous interference from at least one of the first wireless device or the second wireless device to the signal received from the third wireless device.

31. The apparatus of claim 27, wherein the transmit power is a maximum transmit power for the peer-to-peer communication between the first wireless device and the second wireless device.

32. The apparatus of claim 27, further comprising:
means for receiving an acknowledgment (ACK) or a negative acknowledgment (NACK) from the first wireless device using WWAN resources for a peer-to-peer data communication between the first wireless device and the second wireless device; and means for transmitting the received ACK or NACK to the second wireless device using the WWAN resources.

33. The apparatus of claim 27, further comprising means for transmitting a transmission power of reference signals transmitted from the second wireless device to the first wireless device with the grant.

34. The apparatus of claim 27, further comprising means for transmitting a location within WWAN resources of reference signals transmitted from the second wireless device.

35. An apparatus for wireless communication, comprising:
a processing system configured to:
receive a grant from a base station for peer-to-peer communication with a second apparatus using time-frequency resources utilized by a third apparatus for wireless wide area network (WWAN) communication with the base station;

receive a transmit power for the peer-to-peer communication with the grant, the transmit power being determined based on an interference that can be caused to transmissions received by the base station from the third apparatus; and communicate with the second apparatus at a power less than or equal to the received transmit power using peer-to-peer communication on the time-frequency resources.

36. The apparatus of claim 35, wherein the transmit power is a maximum transmit power for the peer-to-peer communication between the apparatus and the second apparatus.

37. The apparatus of claim 35, wherein the processing system is further configured to:
transmit a pilot signal to the second apparatus in said time-frequency resources;

receive channel quality indicator feedback in said time-frequency resources from the second apparatus in response to the transmitted pilot signal; and determine a rate for the communication with the second apparatus based on the received channel quality indicator feedback, wherein the communication with the second apparatus is at the determined rate.

38. The apparatus of claim 35, wherein the processing system is further configured to:
receive a pilot signal from the second apparatus in said time-frequency resources; and transmit channel quality indicator feedback in said time-frequency resources to the second apparatus in response to the received pilot signal, wherein the communication with the second apparatus is at a rate determined based on the channel quality indicator feedback.

39. The apparatus of claim 35, wherein the processing system is further configured to:
receive reference signals from the second apparatus;
receive a first power with the grant, the first power being a power at which the reference signals were transmitted;
determine a second power at which the reference signals were received;
estimate a channel based on the first power and the second power; and
determine a rate for the communication with the second apparatus based on the estimated channel and the received transmit power,
wherein the communication with the second apparatus is at the determined rate.

40. The apparatus of claim 39, wherein the processing system is further configured to receive a location within WWAN resources of reference signals transmitted from the second apparatus, the location of the reference signals within the WWAN resources being received from the base station.

41. The apparatus of claim 35, wherein the processing system is further configured to transmit an acknowledgment (ACK) or a negative acknowledgment (NACK) for a peer-to-peer data communication to the base station using WWAN resources.

42. The apparatus of claim 35, wherein the processing system is further configured to receive an acknowledgment (ACK) or a negative acknowledgment (NACK) for a peer-to-peer data communication from the base station using WWAN resources, the ACK or the NACK originating from the second apparatus.

43. The apparatus of claim 35, wherein the grant is received from the base station only when the interference is less than a threshold.

44. An apparatus for wireless communication, comprising:
a processing system configured to:
transmit a grant to a first wireless device and a second wireless device in peer-to-peer communication with the first wireless device using time-frequency resources utilized by a third wireless device for wireless wide area network (WWAN) communication with the apparatus;
determine a transmit power for the peer-to-peer communication between the first wireless device and the second wireless device based on an estimated interference to a signal received from the third wireless device; and
transmit the transmit power with the grant to at least the first wireless device.

45. The apparatus of claim 44, wherein the interference is estimated based on at least one of the received signal quality or signal power from the third wireless device and at least one of the first wireless device or the second wireless device.

46. The apparatus of claim 44, wherein the processing system is further configured to determine whether to transmit the grant based on whether the estimated interference is less than a threshold.

47. The apparatus of claim 44, wherein the interference is estimated based on a previous interference from at least one of the first wireless device or the second wireless device to the signal received from the third wireless device.

48. The apparatus of claim 44, wherein the transmit power is a maximum transmit power for the peer-to-peer communication between the first wireless device and the second wireless device.

49. The apparatus of claim 44, wherein the processing system is further configured to:
receive an acknowledgment (ACK) or a negative acknowledgment (NACK) from the first wireless device using WWAN resources for a peer-to-peer data communication between the first wireless device and the second wireless device; and
transmit the received ACK or NACK to the second wireless device using the WWAN resources.

50. The apparatus of claim 44, wherein the processing system is further configured to transmit a transmission power of reference signals transmitted from the second wireless device to the first wireless device with the grant.

51. The apparatus of claim 44, wherein the processing system is further configured to transmit a location within WWAN resources of reference signals transmitted from the second wireless device.

52. A computer program product in a first wireless device, comprising:
a non-transitory computer-readable medium comprising code for:
receiving a grant from a base station for peer-to-peer communication with a second wireless device using time-frequency resources utilized by a third wireless device for wireless wide area network (WWAN) communication with the base station;
receiving a transmit power for the peer-to-peer communication with the grant, the transmit power being determined based on an interference that can be caused to transmissions received by the base station from the third wireless device; and
communicating with the second wireless device at a power less than or equal to the received transmit power using peer-to-peer communication on the time-frequency resources.

53. A computer program product in a base station, comprising:
a non-transitory computer-readable medium comprising code for:
transmitting a grant to a first wireless device and a second wireless device in peer-to-peer communication with the first wireless device using time-frequency resources utilized by a third wireless device for wireless wide area network (WWAN) communication with the base station;
determining a transmit power for the peer-to-peer communication between the first wireless device and the second wireless device based on an estimated interference to a signal received from the third wireless device; and
transmitting the transmit power with the grant to at least the first wireless device.

* * * * *